United States Patent [19]
Ward

[11] 3,817,545
[45] June 18, 1974

[54] VEHICLE
[76] Inventor: Bruce K. Ward, 1338 First Ave. S., Minneapolis, Minn. 55403
[22] Filed: Sept. 8, 1972
[21] Appl. No.: 287,501

[52] U.S. Cl.......... 280/34 R, 180/14 R, 296/23 MC, 296/26
[51] Int. Cl............................ B60d 1/00, B60p 3/32
[58] Field of Search ....... 296/23 MC, 26; 180/14 R; 280/34 R, 34 A

[56] References Cited
UNITED STATES PATENTS

| | | | |
|---|---|---|---|
| 3,532,236 | 10/1970 | Hostetler.................... | 296/23 MC X |
| 3,586,119 | 6/1971 | Chuchua et al................... | 180/14 R |
| 3,637,251 | 1/1972 | Plant.............................. | 296/23 MC |
| 3,729,224 | 4/1973 | Hathaway...................... | 296/23 MC |

Primary Examiner—Richard E. Aegerter
Assistant Examiner—James W. Miller

[57] ABSTRACT

A vehicle having a power unit and a housing removably mounted with a break-open hitch assembly on the power unit. The power unit has an open top body that is covered by the housing. The front portion of the housing has an opening providing access between the interior of the housing and the driver-passenger compartment of the power unit, permitting full concurrent use of the housing and driver-passenger compartment. A wheel and axle assembly behind the power unit supports the housing. The hitch assembly has a first forwardly directed member and a second forwardly directed member articulately connected together. The members are releasably attached to cooperating structure on the power unit whereby the housing will initially swing upwardly so that the power unit can be readily detached from the housing.

28 Claims, 17 Drawing Figures

PATENTED JUN 18 1974 3,817,545

PATENTED JUN 18 1974 3,817,545

VEHICLE

BACKGROUND OF THE INVENTION

Numerous motor vehicle designs have been developed to accommodate passengers and cargo. These designs are directed to either the bodies for the vehicles or trailer, campers and covers carried by or towed by motor vehicles. Recreational vehicles, as truck campers, have been developed to utilize the body of the truck to carry a camper to provide usable living space. An example of this design is shown by McNamee in U.S. Pat. No. 3,475,048. These units are permanently attached to the body of the vehicle, thereby limiting the utility of the vehicle. Further examples of combined vehicles which can be separated are shown by Levoyer in U.S. Pat. No. 2,001,619 and Miller et al. in U.S. Pat. No. 3,719,244.

Ward in U.S. Pat. No. 3,547,480 shows a camper mounted on an entirely carried by an automobile to prevent full concurrent use of the interior of the camper and the passenger compartment of the automobile. The automobile requires heavy-duty suspension and braking systems. The camper can be removed from the automobile and expanded to provide an enlarged self-contained structure.

SUMMARY OF THE INVENTION

The invention relates to a vehicle having a motor driven power unit and a housing or enclosure removably mounted on the power unit. The housing has a front wall containing an opening providing access between the interior and the housing and the driver-passenger compartment of the power unit. The opening can be closed, whereby the housing can be a self-contained unit, as a camper, when attached or detached from the power unit. The housing is removably mounted on the power unit with a hitch means operable to permit the power unit to be used separately from the housing. The power unit body has an open top bed for accommodating a portion of the housing. The bed can be closed when the housing is removed from the bed. The rear section of the housing is located behind the power unit. A wheel and axle assembly on the rear section of the housing is connected to the frame of the power unit with the hitch means and takes a substantial portion of the load of the housing. The power unit can have two or more rear axles, a front wheel drive system, a rear wheel drive system, or a four wheel drive system.

One feature of the housing is in the roof. The roof has an upwardly projected dome. Incorporated in the sides of the dome are windows. Portions of the roof surrounding the dome have interlocking structure for accommodating an inverted boat and securing the boat to the roof structure. The sides of the boat have transparent panels aligned with the windows in the dome portion of the roof, permitting light to enter the interior of the housing.

The housing is coupled to the body of the power unit with a hitch means that permits convenient decoupling of the housing from the power unit. The hitch means can also be used as a tongue to support the housing in trailer fashion on a conventional vehicle.

It is an object of the invention to provide in a vehicle a power unit and housing that are usable together when the housing is mounted on the power unit and separately when the housing is detached from the power unit. Another object of the invention is to provide a motor vehicle which allows easy access and exchange between the driver compartment of the power unit and the living and/or service compartment of the housing. A further object of the invention is to provide a housing that may be readily removed from a power unit so that the power unit will have independent utility. Another object of the invention is to provide a hitch assembly for a combined housing and power unit that tows the housing thereby avoiding heavy-duty suspension and braking system on the power unit. Yet another object of the invention is to provide a hitch assembly for a combined power unit and housing which can be used as a tongue to tow the housing in trailer-like fashion. A still further object of the invention is to provide a housing with a roof structure adapted to accommodate an inverted boat. A further object of the invention is to provide, when needed, a removable rear bumper of the power unit which may be used as a rear bumper of a housing when both units are being used concurrently. A trailer hitch ball mounted to the bumper provides the hitch ball to tow a trailer behind the power unit or trailer unit.

Referring to the drawings, there is shown in FIGS. 1 to 4 the housing or camper 20 of the invention separated from the power unit. The housing 20 can be used as a recreational vehicle, as a camper, trailer or shelter or as a commerical structure, as a mobile office, store room, and the like. The housing 20 has a main body indicated generally at 21 having a forward overhead extension 22. The extension 22 has a generally broad, V-shaped rearwardly converging front wall 23. Located below the rear portion of extension 22 is a generally upright forward wall 24 having a front door 26. Door 26 has a window 27. Door 26 can be removed or may be a foldable unit or panel so as to provide access into the interior of the main body 21 from both the outside and the driver compartment of the power unit.

Housing 20 has a roof 28 covering both the main body 21 and the forward extension 22. Located on the roof 28 is an inverted boat 29. The boat 29 has sides 31 containing windows 32. The roof 28 of the housing has an upwardly projected dome (not shown) having windows which are aligned with the windows 32 to permit light to enter the inside of the housing. Located rearwardly of boat 29 are luggage rails 39 secured to the back portion of roof 28.

Body 21 has generally upright convex side walls 41. Each side wall 41 has longitudinal or horizontal windows 42 in the upper portion thereof. Wheel and axle assembly indicated generally at 43 supports the body 31 rearwardly of the power unit. The wheel and axle assembly is connected to the frame of the power unit with a hitch to take a substantial portion of the load of the camper.

When the housing 20 is detached from the power unit, it is supported by the wheel and axle assembly 43 and separate downwardly directed legs 44 connected to the rear portion of the extension 22. The legs 44 are of the extensible type and can be retracted into extension 22. Other types of supporting legs can be used to hold the forward portion of the housing in a generally horizontal position.

Figure 1:
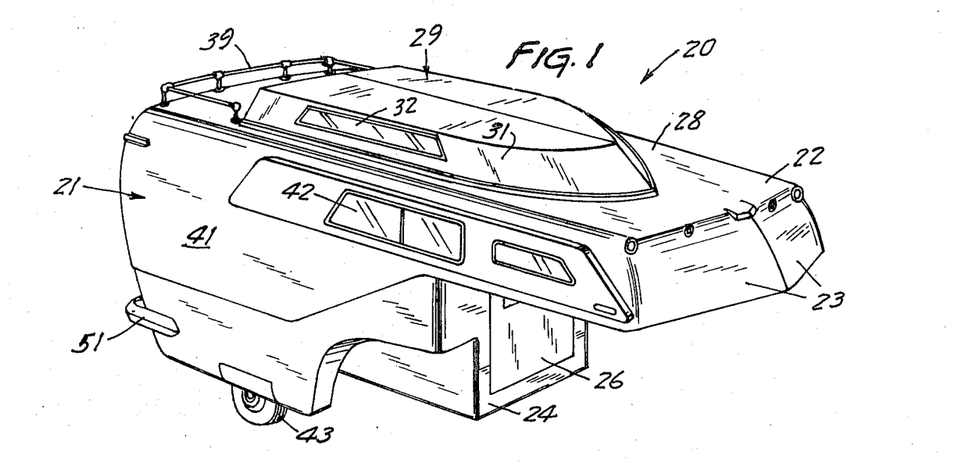
FIG. 1 is a perspective view of the housing of the invention separated from the power unit.
Figure 2:
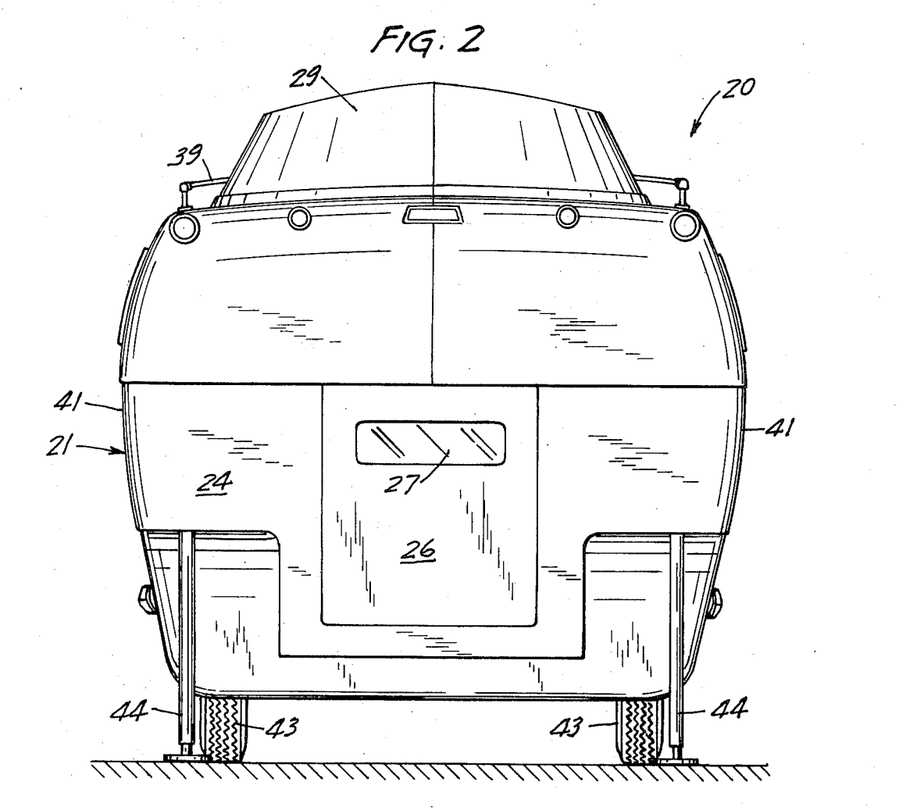
FIG. 2 is a front elevational view of FIG. 1.
Figure 3:
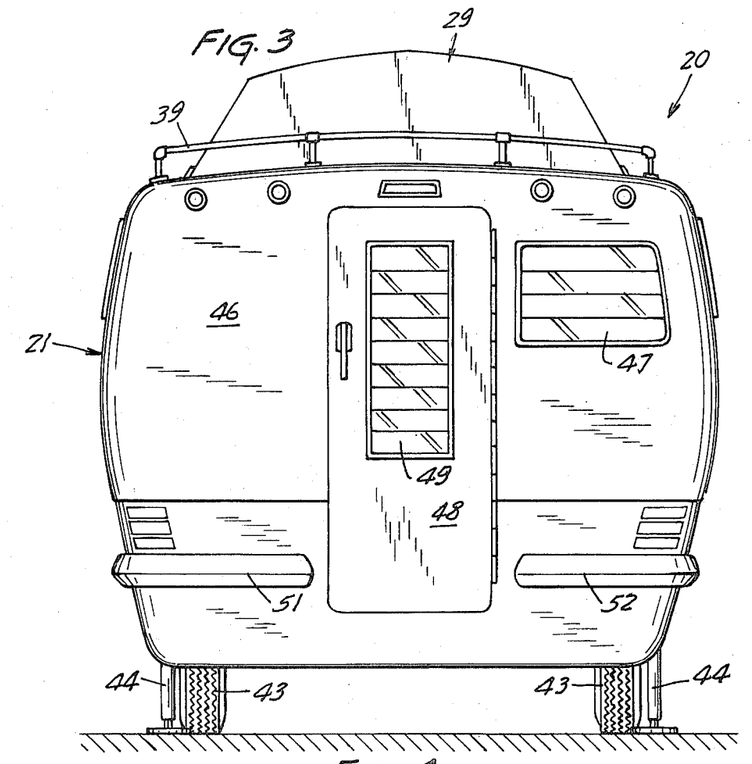
FIG. 3 is a rear elevational view of FIG. 1.
Figure 4:
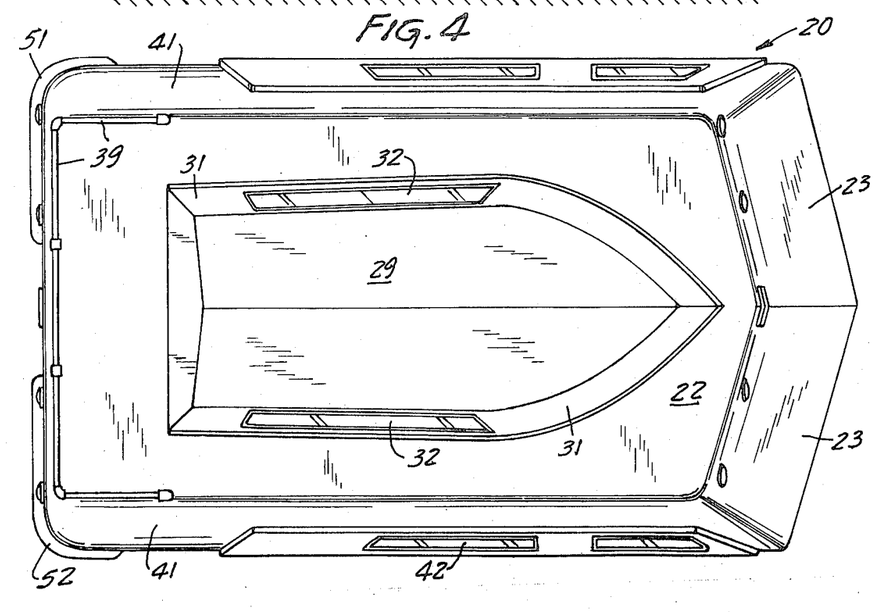
FIG. 4 is a top plan view of the housing of FIG. 1.

Referring to FIG. 3, body 21 has a generally upright rear wall 46 having a window 47 on the right side thereof. The mid-portion of the upright wall 46 supports a generally upright door 48. The door has a window 49. Located adjacent opposite portions of the bottom of door 48 are bumper units 51 and 52 which provide protection for the rear and side portions of the body.

Referring to FIGS. 5 to 8, there is shown a vehicle indicated generally at 60 having a motor driven power unit 61 or an enclosure or housing means 62 which are usable together. The vehicle 60 has full and concurrent use of both the driver-passenger compartment and living or service compartment of the housing means. The power unit 61 is a motor vehicle having a body 63 enclosing a driver-passenger compartment 64. Body 63 can have a rear passenger area containing one or more seats. Power unit 61 can be a passenger auto having a custom body to accommodate the housing, a pick-up truck, a utility motor vehicle as a four wheel drive unit, an open top van truck, or a vehicle chassis having a special body. The driver compartment 64 contains the usual seats, instrument panel, steering wheel and operating equipment for the motor vehicle. The vehicle 60 has front drive wheels 66 and rear wheels 67. The vehicle can be a four wheel drive vehicle. The body 63 has an open top 68 located in longitudinal alignment with housing 62. Transverse bumper 69 is secured to the rear portion of the power unit frame.

Figure 9:
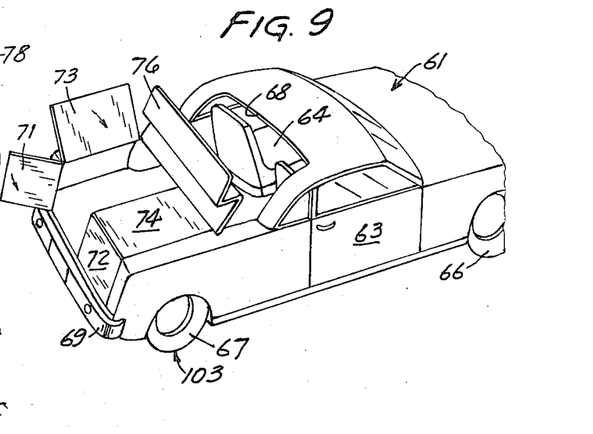
FIG. 9 is a perspective view of the power unit separated from the housing.

As shown in FIG. 9, the open top 68 of body 63 is closed with a pair of rear doors 71 and 72 and a pair of top lids 73 and 74. The driver-passenger compartment is closed with a folding cover 76. Other closing structures, as a movable sun roof panel, an upwardly movable window stored in the rear seat of the power unit, panel stored in roof of power unit and the like may be utilized. The doors 71 and 72 are hinged at the sides of the doors and contain inter-engaging latches to hold them in a generally upright closed position. Lids 73 and 74 are located in a generally horizontal position and are hinged at their outer edges to opposite sides of the body and can fold downwardly to a generally upright position so that the door 71 and lid 73 will be located in a generally upright side-by-side position. In a similar manner, door 72 and lid 74 can be pivoted to a generally upright, side-by-side relationship adjacent the side wall of the body, thereby providing a full bed for accommodating the housing 62.

Returning to FIGS. 5 to 8, the enclosure or housing 62 is a box-shaped structure having generally upright side walls 77 and 78 joined to a roof 79. The lower portions of side walls 77 and 78 are joined to a generally horizontal floor 81. The housing 62 encloses a living or service compartment 82. Housing 62 has a front extension 83 that extends over the top of the driver-passenger compartment 64 of the power unit body 63. The front extension 83 has a front wall containing a plurality of windows 84. Separate releasable latches 85 are used to connect extension 83 to the top of the body 63 over the compartment 64.

The back of the housing is closed with a generally upright rear wall 86 having a horizontally extended window 87. Attached to the frame at the lower portion of the rear wall 86 is a transverse bumper 88.

Figure 5:
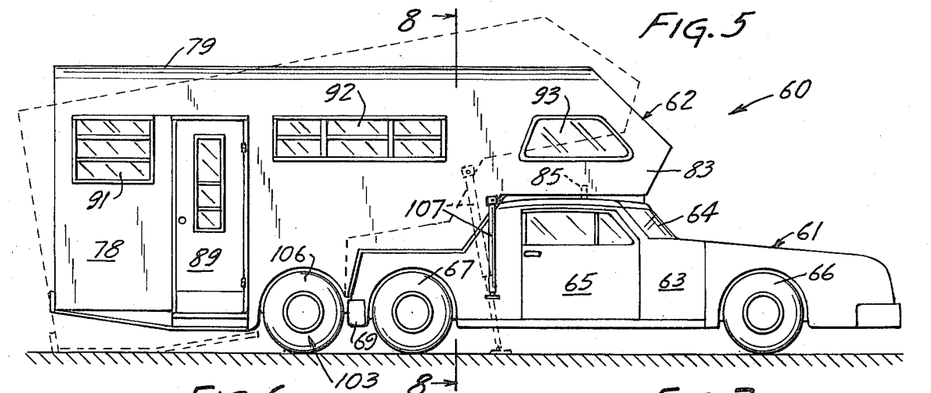
FIG. 5 is a side view of the vehicle of the invention.
Figure 6:
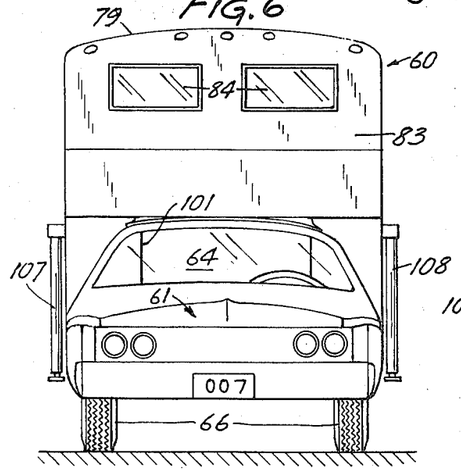
FIG. 6 is a front elevational view of FIG. 5.
Figure 7:
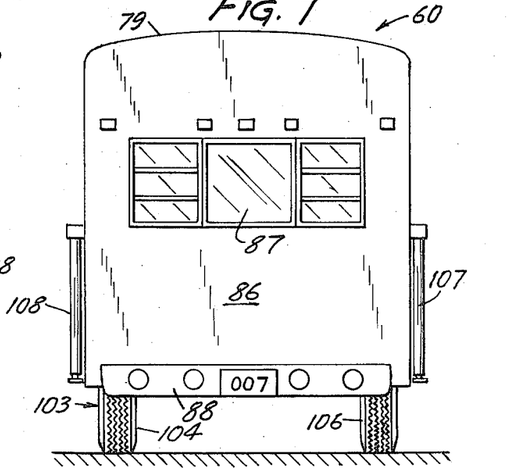
FIG. 7 is a rear elevational view of FIG. 5.

As shown in FIG. 5, side wall 78 has a door 89 and a plurality of side windows 91, 92 and 93. Other shapes and positions of the windows can be incorporated in the side wall 78. Side wall 77 can have comparable windows.

Figure 8:
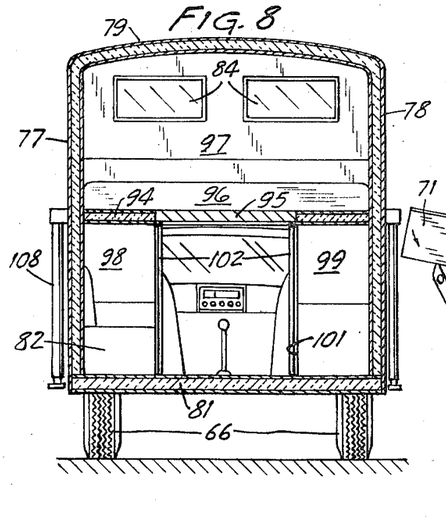
FIG. 8 is a sectional view taken along the line 8—8 of FIG. 5.

Referring to FIG. 8, the bottom of the front extension 83 has a horizontal panel or shelf 94 carrying a mattress 96 providing a forward bunk or cabin 97. The middle section of the shelf 94 of the front extension 83 above the opening 68 of the power unit 61 is open permitting walk-in access from the compartment 82 to the driver-passenger compartment 64. This opening can be closed with a door 95. Other closures as a sliding panel, folding panel, or the like can be used to close the opening in the shelf 94.

Extended downwardly from the rear portion of the horizontal panel 97 are lower front walls or front panels 98 and 99 separated from each other with an opening or passageway 101 aligned with the opening in shelf 94. Passageway 101 is of a size to permit free access between the living compartment of the housing and the driver-passenger compartment of the power unit. Opening 101 can be closed with door structures 102. The door structures can be laterally sliding members, roll down members, folding curtains, movable panels, sliding panels, or the like. The door structure 102 can be closed when the housing is mounted on the power unit 60 and when the housing is separated from the power unit.

The rear section of the housing means is supported by a wheel and axle assembly indicated generally at 103 located behind the power unit. The wheel and axle assembly has a pair of wheels 104 and 106 that are attached to the frame of the housing means with a conventional transverse axle and springs. A tandem wheel and axle assembly can be attached to the frame of the housing means. Each wheel and axle assembly can have dual wheels to support the load of the housing and rear portion of the power unit. The rear wheels of the power unit may be raised to an inoperative position whereby the wheel and axle assembly of the housing supports both the housing and rear of the power unit. Lifting jacks 107 and 108 are secured to opposite sides of the front section of the housing to facilitate removal of the housing from the power unit and support the front section of the housing unit on separation of the power unit from the housing.

Figure 10:
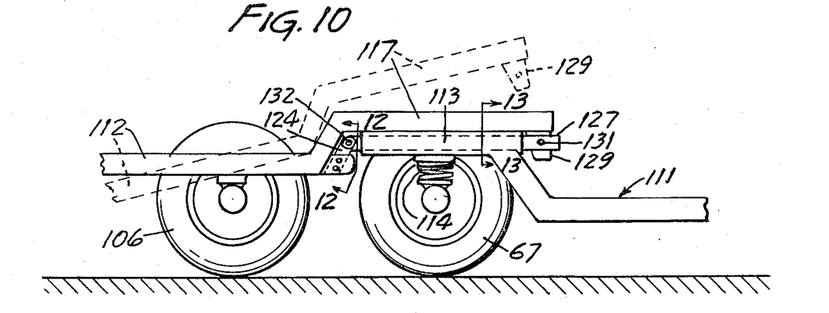
FIG. 10 is a diagrammatic side view of the hitch assembly coupling the housing with the power unit.
Figure 11:
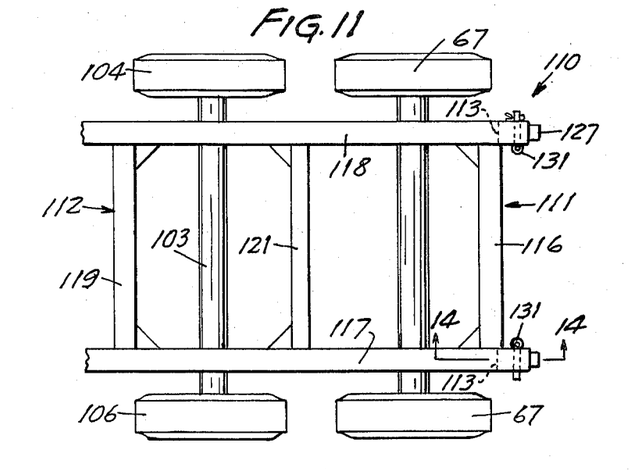
FIG. 11 is a top plan view of FIG. 10.
Figure 12:
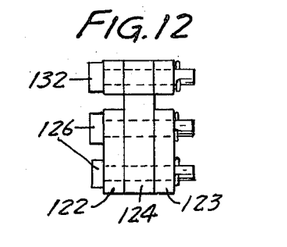
FIG. 12 is an enlarged sectional view taken along the line 12—12 of FIG. 10.
Figure 13:
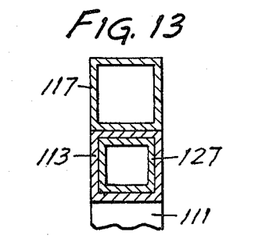
FIG. 13 is an enlarged sectional view taken along the line 13—13 of FIG. 10.
Figure 14:
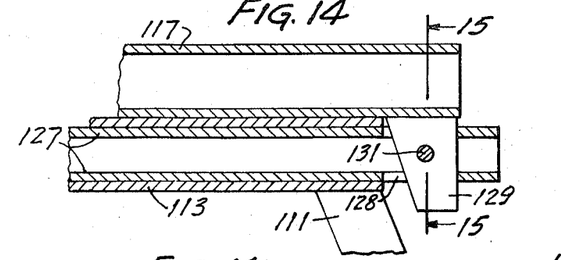
FIG. 14 is an enlarged sectional view taken along the line 14—14 of FIG. 11.
Figure 15:
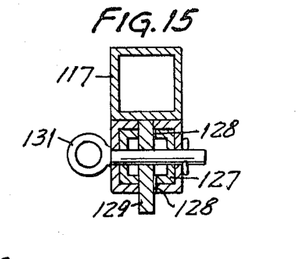
FIG. 15 is a sectional view taken along the line 15—15 of FIG. 14.

Referring to FIGS. 10 and 11, there is shown a hitch assembly indicated generally at 110, for coupling the housing 62 to the power unit 61. Hitch assembly 110 is an extension of the power unit frame 111 and housing frame 112. The rear portion of the power unit frame 111 has a pair of rearwardly projected longitudinal beams 113 which carry the suspension structure 114 for the rear wheels 67. Beams 113 are connected to each other with cross member 116. A flat plate may be used to connect beams 113. The forward portion of the housing frame 112 has forwardly projected longitudinal arms 117 and 118 aligned with beams 113. Cross members 119 and 121 connect the arms. Arms 117 and 118 have an upwardly directed offset section having forwardly extended lips or plates 122 and 123. As shown in FIG. 12, plates 122 and 123 are laterally spaced from each other and accommodate a member 124. A pair of bolts 126 connect the member 124 to plates 122 and 123. Arms 117 and 118 have similar structure.

Beams 113 are preferably longitudinal box beams. Slideably disposed within beam 113 are forwardly directed elongated members or second arms 127. Each arm 127 has a forward end projected through the beams 113. The forward end has an elongated longitudinal slot 128 for accommodating a downwardly directed rib or fin 129 secured to the bottom of the arm 117. A transverse pin 131 is located through transverse holes in member 127 and rib 129 to couple the rib 129 to elongated member 127. The transverse pivotal connection 132 connects the rear portion of member 127 to the member 124. The beams 113 and arms 127 comprise complementary interlocking members. Other complementary interlocking structures, as interlocking tongue and groove, rail and groove means, and the like can be used in lieu of beams 113 and arms 127. The interlocking structures have minimal relative lateral and vertical movements whereby the frame of the housing is a relatively rigid longitudinal extension of the frame of the power unit whereby the vehicle has a tandem rear wheel support system. This allows for equalization of load on the rear wheel support system and produces a smooth ride by reducing sway, buffeting and bouncing.

Figure 16:
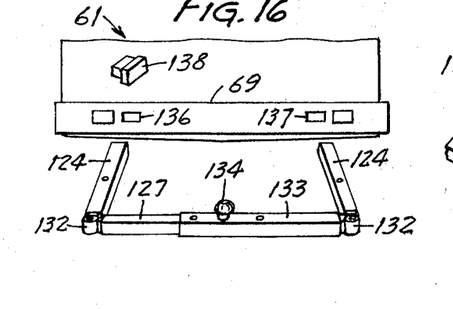
FIG. 16 is a perspective view of a modified use of the hitch assembly.

Referring to FIG. 16, there are shown the hitch members 124 and 127 being arranged as a towing hitch for the power unit. Hitch members 124 and 127 are located in right angle relationship. Members 127 are connected with a beam 133. The midportion of the beam has an upright ball for receiving a ball receiving member. The rear of power unit 61 has a bumper 69. The bumper 69 is provided with openings 136 and 137 to accommodate members 124 to thereby couple the hitch to the power unit. Openings 136 and 137 are aligned with the passageway in beams 113. When the hitch is removed from power unit 61, separate rubber plugs 138 are used to close openings 136 and 137.

Figure 17:
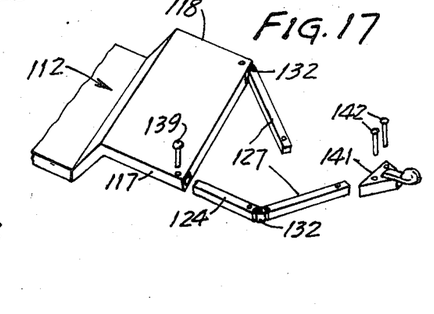
FIG. 17 is a perspective view of a further modification of the hitch assembly.

Referring to FIG. 17, there is shown a further utilization of hitch members 124 and 127. The hitch members are used to provide a towing tongue for the housing frame 112. Members 124 slide into the elongated openings in members 117 and 118 and are retained therein with fasteners such as pins 139. A ball receiving member is secured to the outer end of the members 127 with fasteners, as bolts 142, to provide a towing hitch assembly for the housing unit.

While there have been shown and described preferred embodiments of the invention, it is understood that changes, additions, substitution of construction materials, structures and hitches may be made by those skilled in the art without departing from the invention. For example, the housing can have a width which is greater than the width of the power unit. Also, the transverse pivots 132 of the hitch assembly can be located over axle 103 in lieu of the forwardly located pivots 132.

The embodiments of the invention in which an exclusive property or privilege is claimed are defined as follows:

1. A vehicle comprising: a power unit having a body and a driver-passenger compartment, a portion of the body having an opening to the driver-passenger compartment, housing means enclosing a space, said housing means having an open portion in communication with the opening in the body whereby the housing space and driver compartment can be concurrently used, wheel means mounted on the housing means behind the power unit to support a substantial portion of the housing means, and hitch means connecting the housing means to the power unit, said hitch means having means connected to the housing means, said means connected to the housing means including longitudinally elongated first means having a forward end portion and longitudinally elongated second means having a forward end portion located generally in the same upright plane as the first means, connector means releasably attaching the forward end portions of the first means and second means, and pivot means pivotally connecting the first means with the second means whereby the first means can pivot upwardly away from the second means when the connector means is released, means secured to the power unit having passage means for accommodating the second means whereby when the connector means is released the forward portion of the housing means can move upwardly away from the power unit and the housing means separated from the power unit when the second means is released from the means secured to the power unit.

2. The vehicle of claim 1 wherein: the housing means has an upwardly directed front wall, said opening in the housing means being in the front wall.

3. The vehicle of claim 2 including: closure means for closing the opening in the housing means.

4. The vehicle of claim 1 wherein: the housing means has a forward section located over the driver compartment.

5. The vehicle of claim 1 wherein: the housing means has a rigid frame, said first means of the hitch means comprising forwardly projected arms secured to the frame, and said second means of the hitch means being elongated members located below the arms, said pivot means including transverse pivots connecting the elongated members to the arms.

6. The vehicle of claim 1 wherein: the power unit has a front wheel drive system.

7. The vehicle of claim 1 wherein: said means secured to the power unit includes longitudinal beam means, said beam means having longitudinal passages for receiving the second means.

8. The vehicle of claim 1 including: closure means for closing the opening in the body of the power unit.

9. A vehicle comprising: a power unit having a body and a driver-passenger compartment, a portion of the body having an opening to the driver-passenger compartment, housing means enclosing a space, said housing means having an open portion in communication with the opening in the body whereby the housing space and driver-passenger compartment can be concurrently used, and hitch means connecting the housing means to the power unit, said hitch means having means connected to the housing means, said means connected to the housing means including longitudinally elongated first means having a forward end portion and longitudinally elongated second means having a forward end portion located generally in the same upright plane as the first means, connector means releasably attaching the forward end portion of the first means and second means, and pivot means pivotally connecting the first means with the second means whereby the first means can pivot upwardly away from the second means when the connector means is released, means secured to the power unit having passage means for accommodating the second means whereby when the connector means is released the forward portion of the housing means can move upwardly away from the power unit and the housing means separated from the power unit when the second means is released from the means secured to the power unit.

10. The vehicle of claim 9 wherein: the housing means has a generally upright front wall, said opening in the body being in the front wall.

11. The vehicle of claim 9 including: door means for closing the opening in the body.

12. The vehicle of claim 9 wherein: the housing means has a forward section located over the driver compartment.

13. The vehicle of claim 9 wherein: the housing means has a rigid frame, said first means of the hitch means comprising forwardly projected arms secured to the frame, and said second means of the hitch means being elongated members located below the arms, said pivot means including transverse pivots connecting the elongated members to the arms.

14. The vehicle of claim 9 wherein: the power unit has a front wheel drive system.

15. The vehicle of claim 9 wherein: said means secured to the power unit includes longitudinal beam means, said beam means having longitudinal passages for receiving the second means.

16. The vehicle of claim 9 wherein: said housing means includes a generally upright front wall means and a generally horizontal means extended forwardly from the upper portion of the front wall means, said front wall means having a generally upright opening, said generally horizontal means having a forwardly directed opening aligned with the upper portion of the upright opening, said body having a generally upright back opening and a roof with a forwardly directed top opening aligned with the back upright opening, said forwardly directed opening having a width less than the width of the roof, said openings in the body being generally aligned with the openings in the front wall means and the horizontal means thereby providing a walk-through passage between the housing space and driver compartment.

17. The structure of claim 16 including: door means mounted on said generally horizontal means for closing said forwardly directed opening.

18. The housing means of claim 16 including: first door means mounted on said generally horizontal means for closing said forwardly directed opening, and second door means mounted on said front wall means for closing said generally upright opening in the front wall means.

19. Hitch means for coupling a power unit having a body and a housing means enclosing a space, said hitch means comprising: means connected to the housing means, said means connected to the housing means including longitudinally elongated first means having a forward end portion and longitudinally elongated second means having a forward end portion located generally in the same upright plane as the first means, connector means releasably attaching the forward end portions of the first means and second means, pivot means pivotally connecting the first means with the second means whereby the first means can pivot upwardly away from the second means, means secured to the power unit having passage means for receiving the second means to releasably connect the second means to the power unit whereby when the connector means is released the forward portion of the housing means can move upwardly away from the power unit and the second means can be separated from the power unit.

20. The hitch means of claim 19 wherein: said means secured to the power unit comprises elongated means having longitudinal passages for receiving the second means.

21. The hitch means of claim 19 wherein: the first means comprise forwardly projected arms secured to the housing means.

22. A vehicle comprising: a power unit having a body and driver-passenger compartment, a portion of the body having a generally upright back opening and a forwardly directed top opening to the driver-passenger compartment, housing means enclosing a space, said housing means including an upright front wall means and a generally horizontal means extended forwardly from the upper portion of the front wall means, said front wall means having an upright open portion in communication with the back opening in the body and said horizontal means having a forwardly directed opening in the body, whereby the housing space and driver-passenger compartment can be concurrently used, means for closing said openings when the housing menas is on the power unit and detached from the power unit, wheel means mounted on the housing means behind the power unit to support a substantial portion of the housing means, and hitch means releasably connecting the housing means to the power unit whereby the housing means can be detached from the power unit, said hitch means comprising means connected to the housing means, said means connected to the housing means including longitudinally elongated first means having a forward end portion and longitudinally elongated second means having a forward end portion located generally in the same upright plane as the first means, connector means releasably attaching the forward end portions of the first means and the second means, pivot means pivotally connecting the first means with the second means whereby the first means can pivot upwardly away from the second means, means secured to the power unit having passage means for receiving the second means to releasably connect the second means to the power unit whereby when the connector means is released the forward portion of housing means can move upwardly away from the power unit and the second means can be separated from the power unit.

23. The vehicle of claim 22 wherein: the housing means has a generally upright front wall, said opening in the body being in the front wall.

24. The vehicle of claim 22 wherein: the housing means has a forward section located over the driver compartment.

25. The vehicle of claim 22 wherein: the housing means has a rigid frame, said first means of the hitch means comprises forwardly projected arms secured to the frame.

26. The vehicle of claim 22 wherein: the power unit has a front wheel drive system.

27. The vehicle of claim 22 including: closure means for closing the openings in the body of the power unit.

28. The housing means of claim 16 including: wheel means for supporting a rear portion of the means enclosing a housing space.

* * * * *

PO-1050
(5/69)

UNITED STATES PATENT OFFICE
CERTIFICATE OF CORRECTION

Patent No. 3,817,545          Dated June 18, 1974

Inventor(s) Bruce K. Ward

It is certified that error appears in the above-identified patent and that said Letters Patent are hereby corrected as shown below:

Column 1, line 21, "prevent" should be --provide--.

Column 3, line 16, "31" should be --21--.

Column 8, line 50, "menas" should be --means--.

Signed and sealed this 8th day of October 1974.

(SEAL)
Attest:

McCOY M. GIBSON JR.          C. MARSHALL DANN
Attesting Officer            Commissioner of Patents